United States Patent [19]
Presley

[11] 4,257,174
[45] Mar. 24, 1981

[54] DEVICE FOR TEACHING COUNTING

[76] Inventor: Wayman R. Presley, RFD #1, Makanda, Ill. 62958

[21] Appl. No.: 72,917

[22] Filed: Sep. 6, 1979

[51] Int. Cl.³ ............................................. G09B 19/02
[52] U.S. Cl. ...................................................... 434/188
[58] Field of Search ................................... 35/32, 8 A

[56] References Cited
U.S. PATENT DOCUMENTS

| | | | |
|---|---|---|---|
| 1,977,842 | 10/1934 | Badanes | 35/32 |
| 2,442,447 | 6/1948 | Zadig | 35/8 A |
| 3,755,924 | 9/1973 | Langieri, Jr. et al. | 35/32 |

*Primary Examiner*—William H. Grieb
*Attorney, Agent, or Firm*—Shoemaker and Mattare, Ltd.

[57] ABSTRACT

A device for teaching and refining counting skills includes a multiplicity of standards which are hit in a glissando-like movement by a flexible hand-held blade to produce a series of audible clicks. Indicia are mounted interjacent the standards and the indicia correspond to the number of clicks produced in a series of clicks. The indicia are normally hidden from view and are moved into a viewable position to indicate the correct number of clicks sounded in the series.

7 Claims, 4 Drawing Figures

DEVICE FOR TEACHING COUNTING

BACKGROUND OF THE INVENTION

The present invention relates in general to teaching devices, and, more particularly, to devices used in teaching and refining counting skills.

Counting is taught by many different methods. Rote memory is used, sets are used and the like. However, there is a large difference between theory, that is rote memory and the like, and the practical application of that theory. It is often the application of the counting skill that causes problems.

Thus, there is need for a device which permits a student to use counting skills in an applied situation.

Teaching is very effective when immediate feedback of a correct answer is possible, and when the student can learn on his own, that is, without requiring a teacher to be present.

There is, therefore, need of a device which provides immediate feedback of the correct answer even when a teacher is not present.

SUMMARY OF THE INVENTION

The device embodying the teachings of the present invention teaches and refines counting skills in an applied manner and a manner which can immediately display a correct answer even when no teacher is present.

The unit includes a plurality of upstanding standards mounted in a base to be spaced from each other a prescribed distance. A housing is mounted on the standards, and a plurality of sliding members are positioned in the housing between adjacent standards.

Viewing holes are defined in the housing between adjacent standards, and sliding member access means are defined subjacent the viewing means and between adjacent standards. Each sliding member has indicia thereon which corresponds to the position of the sliding member in arithmetic progression from "1".

A hand-held flexible member is associated with the unit. The flexible member is moved across the standards in a glissando-like manner to produce a series of audible clicks as the member snaps against each successive standard. The situation is similar to that of a person running a stick along a picket fence.

The indicia on the sliding member correspond to the number of clicks which have sounded up to, and including, the clicks sounded at that indicia location.

A student thus counts the clicks in a series of clicks and then tests the correctness of his count by stopping the movement of the blade and viewing the indicia corresponding to the stopping point. The blade movement can be effected by a teacher, by the student himself, or by another student, or the like. The correct number of clicks is immediately displayed and thus immediate feedback occurs. As the correct answer is automatically presented, a teacher need not be present. Furthermore, the viewing holes, access means, and indicia are in pairs so that the person on each side of the unit can see the correct answer. Thus, students working in pairs can use the device.

Teaching students to count faster and faster will also sharpen the thinking capacity of such students thereby helping them to solve other problems as well.

OBJECTS OF THE INVENTION

It is, therefore, a main object of the present invention to teach counting in an efficient manner.

It is another object of the present invention to teach counting wherein immediate feedback of a correct answer is possible.

It is yet another object of the present invention to enliven and sharpen the thinking capacity of students by teaching them to count faster and faster.

It is still a further object of the present invention to sharpen student's minds by teaching them to count faster and faster to make them better students and better qualified to solve life's problems all during their lives.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
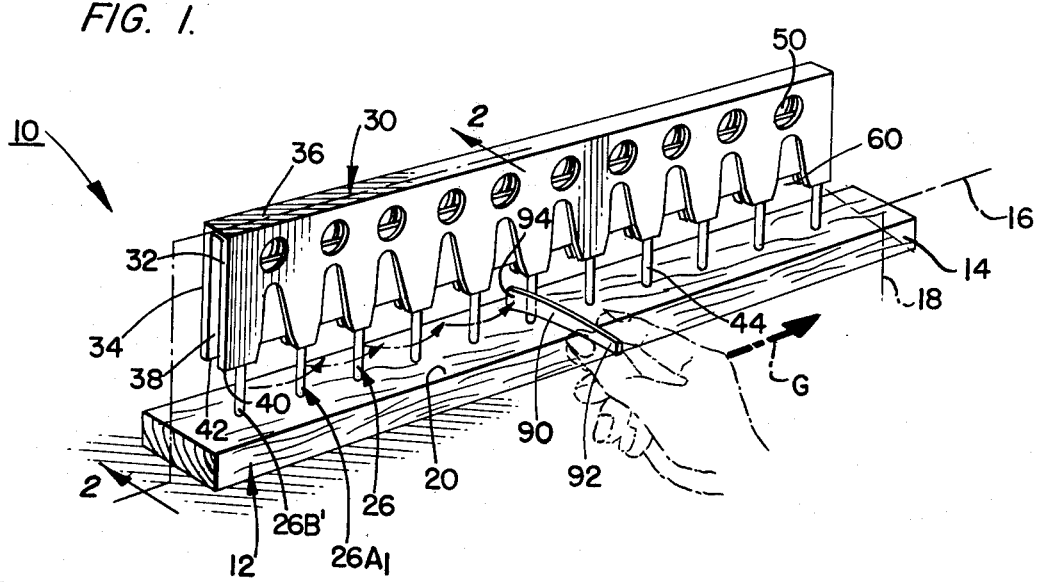
FIG. 1 is a perspective of a counting device embodying the teachings of the present invention.

Shown in FIG. 1 is a perspective view of a unit 10 for teaching counting. The unit 10 is of indeterminate length, and includes a base 12 which, in the preferred embodiment, is rectangular to have a transverse dimension 14, a longitudinal dimension 16 and a thickness dimension 18. The base has a face 20 which is presented upwardly, and a multiplicity of standards 26 are mounted at one end thereof in the base to extend vertically upwardly from the face 20. The standards are spaced, preferably evenly spaced, along the longitudinal dimension 16 of the base. Preferably, although not necessarily, the standards are all co-terminal at the other ends thereof. Preferably, the standards are metal for a purpose which will be evident from the ensuing disclosure.

A U-shaped housing 30 is fixed to the standards and includes a pair of legs 32 and 34 integrally connected to a web section 36 to form a block U configuration. The legs are in spaced parallelism and have a gap 38 defined therebetween. The legs have free ends 40 and 42 which are essentially co-planar and are presented toward face 20 to be vertically spaced therefrom in parallelism therewith so that each standard has a trunk section 44 located between the face 20 and the free ends of the housing.

Figure 2:
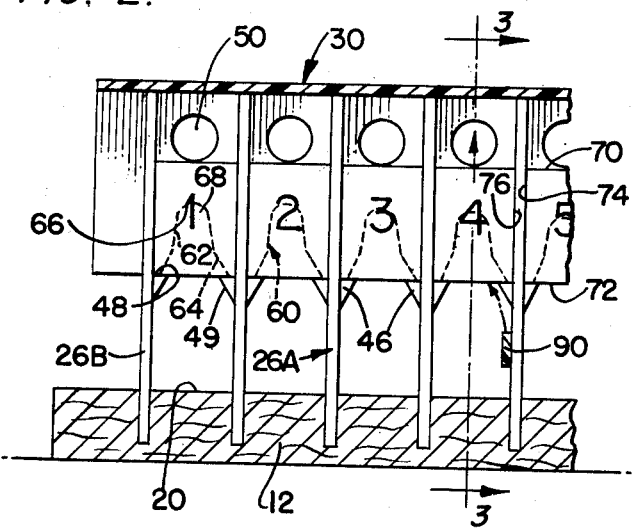
FIG. 2 is a view taken along line 2—2 of FIG. 1.

A plurality of stops 46 are mounted on the standards to be aligned with the base longitudinal dimension and to be co-level with each other. As best shown in FIG. 2, the stops are preferably triangular in shape, and, still more preferably, right triangular in shape with the bases 48 presented upwardly and the hypotenuses 49 presented away from the standard. The triangles are mounted to be aligned with the longitudinal axis of the standards as shown in FIG. 2, and the bases 48 are aligned and co-level with each other. Inner standards 26A have two stops each located on diametric opposite sides thereof, and outer standards 26B have one stop each, with the stops on the outer standards being presented inwardly of the base toward each other, as indicated in FIG. 2 for one stop.

Figure 3:
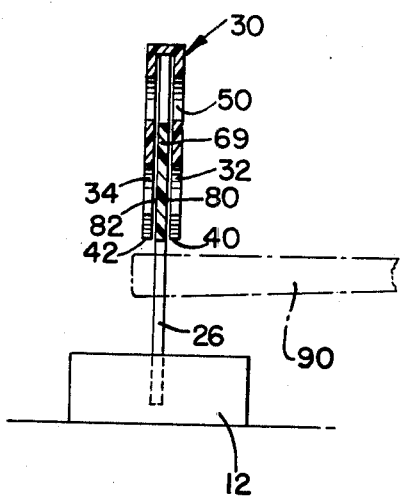
FIG. 3 is a view taken along line 3—3 of FIG. 2.

As best shown in FIGS. 1 and 3, the housing 30 has a plurality of viewing holes 50 defined in the legs 32 and 34 so that a viewing hole in leg 32 is in center-to-center alignment with a viewing hole in leg 34. The aligned viewing holes cooperate with each other to provide a viewing path through the housing. Each pair of cooperating viewing holes is located between a pair of adjacent standards for a purpose to be discussed below.

A rounded V-shaped cutout 60 is defined in each leg subjacent each viewing hole. Each of the cutouts has a pair of upwardly converging legs 62 and 64 and an arcuate apex section 66. The apex section has a diameter sufficient to provide a spacing gap 68 for a purpose to be described hereinafter. The cutouts in leg 32 are coincident with the cutouts in leg 34 in a manner similar to the viewing holes.

As can be seen in the Figures, there is one pair of viewing holes and one pair of cutouts located between each pair of standards. In the preferred embodiment, there are about 3½ to 4 standards per inch and the entire unit includes about 90 standards altogether. While these numbers are preferred, other numbers can be used without departing from the scope of the present invention.

Figure 4:
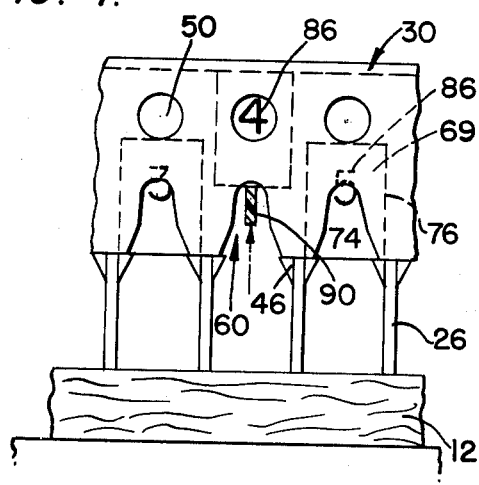
FIG. 4 is an elevation view of a portion of the counting device embodying the teachings of the present invention.

A plurality of sliding members 69 are located in the gap 38 to be positioned between the standards 26. A sliding member is located between each pair of adjacent standards, as best shown in FIGS. 2 and 4. Each sliding member is preferably elongate with a top edge 70, a bottom edge 72, a pair of side edges 74 and 76 and a pair of faces 80 and 82. The width dimension of each of the sliding members is smaller than the spacing between adjacent standards, and the length dimension of each of the sliding members is approximately equal to the spacing between the stop base 48 and the lowermost portion of each of the viewing holes 50 so that, as shown in FIGS. 2 and 4, when the lower edge of the sliding member rests on the stop bases 48, the top edge of the sliding member is subjacent the viewing hole associated therewith. The thickness dimension of each sliding member between the faces 80 and 82 thereof is less than the thickness of gap 38 between the legs 32 and 34 so that the sliding member is freely slidably accommodated in the gap 38 between adjacent standards.

As best shown in FIG. 4, each sliding member has indicia 86 on both faces thereof. The indicia on each face is located to be viewed through the aligned viewing holes 50 when the sliding member is in a first, reading, position wherein the indicia 86 are viewable through the aligned viewing holes 50, and to be hidden from view when the sliding member is in a second, hidden, position wherein the indicia are blocked by the housing and thus cannot be seen. In FIG. 4, the indicia "3" and "5" are hidden, and the indicia "4" are in the reading position to be viewed through each of the aligned viewing holes 50. As indicated in the Figures, the sliding members assume a hidden position under the influence of gravity, and must be moved into the reading position from the hidden position. The hidden position is thus the usual position of the sliding members.

The indicia are arranged in arithemetic progression from "1" with each indicia corresponding to the position thereof. Thus, the first position is "1", the next position is "2", and so forth for "N" positions wherein the next-to-last position is (N-1).

A flexible, hand-held blade 90 is associated with the unit 10. The blade 90 has a proximal end 92 which is held by a user, and a distal end 94 which is forced against the standards 26 to effect a clicking noise.

To operate the unit 10, the blade 90 is hand-held so that the distal end tip 94 is pressed against the first standard 26B' (which is the leftmost standard in FIG. 1) with force sufficient to flex the blade. The blade is moved to the right of the standard 26B' in a glissando-like movement as indicated in FIG. 1 by the arrow G.

The glissando-like movement causes the blade to snap against each succeeding standard after the leftmost standard 26B' to produce a series of audible clicks. Each standard thus causes the blade to click against the next succeeding standard during the glissando movement across the unit 10. Thus, the first click will be sounded when the blade snaps against the standard $26A_1$ after being flexed against standard 26B', and so forth along the unit.

The glissando-like movement can be stopped at any time to define a series, and the number of clicks in such series will be indicated by the indicia located on the sliding member immediately above the blade at the stopping point. The blade can be used to raise the sliding member into the reading position to identify the number of clicks in the series. Thus, in FIG. 4, four clicks have been sounded by the glissando-like movement of the blade to the position shown in FIG. 4.

A teacher can thus teach counting by moving the blade across the trunks of the standards and requiring the pupils to count the audible clicks. The teacher can stop, ask the number of clicks, and then immediately indicate the correct answer for all of the students as well as for the teacher to see. A student can use the device 10 on his own without requiring a teacher as the correct answer is available at all times. The correct answer is immediately available, and thus, immediate feedback is possible, thereby further enhancing the teaching efficiency of the device.

Counting skills can be developed and refined by varying the spacing between the standards, the speed of the glissando movement or the like. The device 10 is thus very effective in teaching and developing counting skills.

A variation of the unit 10 can include coupling means on the base for coupling a plurality of units together to increase the number of clicks, or add varation to the spacing between clicks, or the like, as will occur to those skilled in the art from this disclosure.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:
1. A device for teaching counting skills comprising:
 an elongate base;
 a multiplicity of spaced upright standards mounted on said base;
 a housing mounted on said standards;

a plurality of counting indicia mounting means slidably mounted in said housing between adjacent standards;

counting indicia on said indicia mounting means;

a plurality of viewing means defined in said housing between adjacent standards;

each of said indicia mounting means being slidably mounted in said housing to move from a first position in which said indicia is hidden by said housing to a second position in which said indicia can be viewed via one of said viewing means;

moving means for moving said indicia mounting means from said first position to said second position, said moving means including a blade which contacts each of said standards to produce an audible click as said blade is moved across said multiplicity of standards in a glissando-like movement, each of said counting indicia corresponding to the number of clicks which will have been sounded when said blade has moved from a first standard to a standard adjacent said each counting indicia.

2. The device defined in claim 1 wherein said housing is U-shaped.

3. The device defined in claim 2 further including stop means on said standards and wherein said indicia mounting means include elongate plates and said plates are supported on said stop means in said second position.

4. The device defined in claim 1 wherein said indicia include numbers.

5. The device defined in claim 1 wherein said viewing means include viewing holes defined in said housing.

6. The device defined in claim 5 wherein said viewing holes are in pairs.

7. The device defined in claim 1 wherein said moving means includes an elongate blade which is flexible.

* * * * *